(12) United States Patent
Salah et al.

(10) Patent No.: US 11,582,738 B2
(45) Date of Patent: Feb. 14, 2023

(54) METHOD AND APPARATUS FOR PDCCH MONITORING ENHANCEMENT FOR CARRIER AGGREGATION IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 67 days.

(21) Appl. No.: 17/170,761

(22) Filed: Feb. 8, 2021

(65) Prior Publication Data

US 2021/0282120 A1 Sep. 9, 2021

Related U.S. Application Data

(60) Provisional application No. 62/984,343, filed on Mar. 3, 2020.

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0098* (2013.01)

(58) Field of Classification Search
CPC .................. H04L 5/001; H04L 5/0098
See application file for complete search history.

(56) References Cited

U.S. PATENT DOCUMENTS

2020/0169991 A1* 5/2020 Lin ................. H04L 5/0094
2021/0028961 A1* 1/2021 Lee ................. H04W 48/16

* cited by examiner

*Primary Examiner* — Ayaz R Sheikh
*Assistant Examiner* — Debebe A Asefa
(74) *Attorney, Agent, or Firm* — Han IP PLLC; Andy M. Han

(57) ABSTRACT

Various solutions for physical downlink control channel (PDCCH) monitoring enhancement for carrier aggregation (CA) with respect to user equipment and network apparatus in mobile communications are described. An apparatus may transmit a capability report to indicate a supported PDCCH monitoring capability to a network node. The apparatus may receive a PDCCH monitoring configuration compliant with the supported PDCCH monitoring capability from the network node. The apparatus may determine a monitoring budget based on the PDCCH monitoring configuration and the supported PDCCH monitoring capability. The apparatus may perform a PDCCH monitoring according to the monitoring budget.

20 Claims, 7 Drawing Sheets

METHOD AND APPARATUS FOR PDCCH MONITORING ENHANCEMENT FOR CARRIER AGGREGATION IN MOBILE COMMUNICATIONS

CROSS REFERENCE TO RELATED PATENT APPLICATION(S)

The present disclosure is part of a non-provisional patent application claiming the priority benefit of U.S. Provisional Patent Application No. 62/984,343, filed on 3 Mar. 2020, the content of which being incorporated by reference in its entirety.

TECHNICAL FIELD

The present disclosure is generally related to mobile communications and, more particularly, to physical downlink control channel (PDCCH) monitoring enhancement for carrier aggregation (CA) with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), PDCCH candidates refers to the area in the downlink resource grid where PDCCH may be carried. The UE needs to perform blind decoding throughout these PDCCH candidates trying to find PDCCH data (e.g., downlink control information (DCI)). PDCCH candidates to be monitored are configured for a UE by means of search space sets. Monitoring a large number of PDCCH candidates increases the UE complexity. Therefore, NR specifies the maximum number of PDCCH candidates that require blind decodes and the maximum number of control channel elements (CCEs) that require channel estimations. This limit the UE complexity to a reasonable level with an acceptable restriction on the search space sets for PDCCH monitoring.

In Release-15 (Rel-15) of the $3^{rd}$ Generation Partnership Project (3GPP) technical specification for NR, the limit on the maximum number of PDCCH candidates to monitor in CA scenarios is defined per slot. The maximum number of non-overlapped CCEs or blind decodings (BDs) is specified per slot. In Release-16 (Rel-16) of the 3GPP technical specification for NR, an increased PDCCH monitoring capability on the number of non-overlapped CCEs is proposed for better latency. The explicit limitation on the maximum number of non-overlapping CCEs or BDs is specified per monitoring span.

However, the PDCCH monitoring capability in CA scenarios is yet to be clearly defined. One issue is that the component carriers (CCs) configured with the same span (X,Y) can have staggered spans (i.e., the CCs sharing the same spans (X,Y) are not configured with fully aligned spans). If the spans are not aligned, then the Rel-15 formula for CCEs/BDs budget could not be used and different approach has been defined. The new defined approach comes with extra complexity for UE implementation. Not every UE can support such extra complexity on UE implementation. When the UE can only support the approach for aligned spans, some errors could occur in an event that non-aligned spans are configured to such UE. To avoid failure and un-synchronization on PDCCH monitoring, the network node needs to configure PDCCH monitoring configuration based on UE capabilities. Therefore, it is needed for the UE to report the capability of supporting aligned and/or non-aligned spans.

Accordingly, how to determine/configure the PDCCH monitoring capability in CA scenarios for the aligned and/or non-aligned spans becomes an important issue for the newly developed wireless communication network. Therefore, there is a need to provide proper UE capability report schemes for PDCCH monitoring in CA scenarios.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to PDCCH monitoring enhancement for CA with respect to user equipment and network apparatus in mobile communications.

In one aspect, a method may involve an apparatus transmitting a capability report to indicate a supported PDCCH monitoring capability to a network node. The method may also involve the apparatus receiving a PDCCH monitoring configuration compliant with the supported PDCCH monitoring capability from the network node. The method may further involve the apparatus determining a monitoring budget based on the PDCCH monitoring configuration and the supported PDCCH monitoring capability. The method may further involve the apparatus performing a PDCCH monitoring according to the monitoring budget. The supported PDCCH monitoring capability may comprise a supported span arrangement.

In one aspect, an apparatus may comprise a transceiver which, during operation, wirelessly communicates with network nodes of a wireless network. The apparatus may also comprise a processor communicatively coupled to the transceiver. The processor, during operation, may perform operations comprising transmitting, via the transceiver, a capability report to indicate a supported PDCCH monitoring capability to a network node. The processor may also perform operations comprising receiving, via the transceiver, a PDCCH monitoring configuration compliant with the supported PDCCH monitoring capability from the network node. The processor may further perform operations comprising determining a monitoring budget based on the PDCCH monitoring configuration and the supported PDCCH monitoring capability. The processor may further perform operations comprising performing a PDCCH monitoring according to the monitoring budget. The supported PDCCH monitoring capability may comprise a supported span arrangement.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.
Overview Implementations in accordance with the present disclosure relate to various techniques, methods, schemes and/or solutions pertaining to PDCCH monitoring enhancement for CA with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, PDCCH candidates refers to the area in the downlink resource grid where PDCCH may be carried. The UE needs to perform blind decoding throughout these PDCCH candidates trying to find PDCCH data (e.g., DCI). PDCCH candidates to be monitored are configured for a UE by means of search space sets. Monitoring a large number of PDCCH candidates increases the UE complexity. Therefore, NR specifies the maximum number of PDCCH candidates that require blind decodes and the maximum number of CCEs that require channel estimations. This limit the UE complexity to a reasonable level with an acceptable restriction on the search space sets for PDCCH monitoring.

In Rel-15 of the 3GPP technical specification for NR, the limit on the maximum number of PDCCH candidates to monitor in CA scenarios is defined per slot. The maximum number of non-overlapped CCEs or BDs is specified per slot. In Rel-16 of the 3GPP technical specification for NR, an increased PDCCH monitoring capability on the number of non-overlapped CCEs is proposed for better latency. The explicit limitation on the maximum number of non-overlapping CCEs or BDs is specified per monitoring span.

Figure 1:
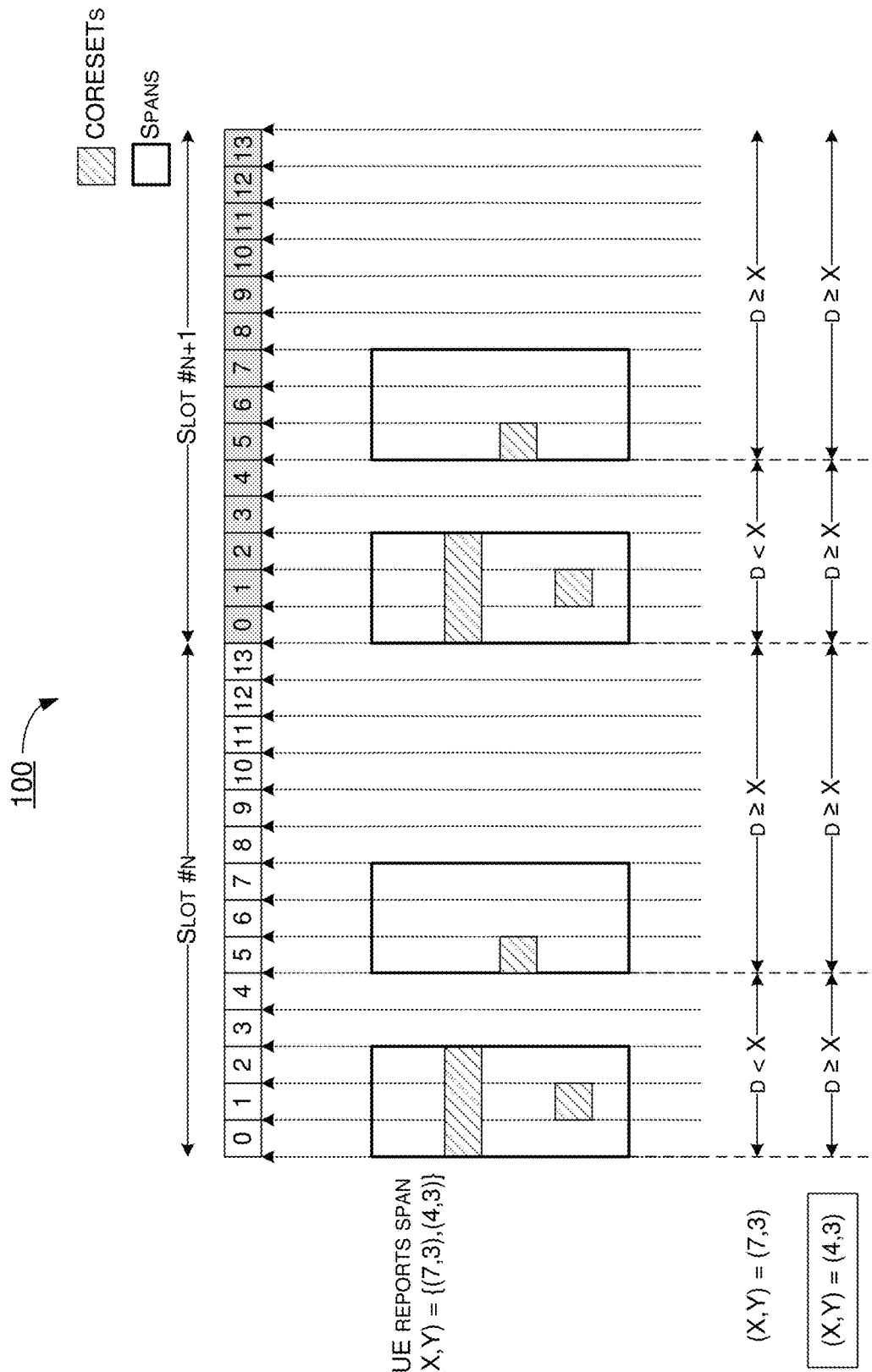
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a plurality of network nodes, which may be a part of a wireless communication network (e.g., an LTE network, a 5G network, an NR network, an IoT network, an NB-IoT network or an IIoT network). The span-based monitoring is used in Rel-16 for the explicit BDs/CCEs budgets. The UE reports one or more combinations of (X,Y) number of symbols, where X≥Y, for PDCCH monitoring. A span is a set of consecutive symbols in a slot in which the UE is configured to monitor PDCCH candidates. The UE supports PDCCH monitoring occasions in any symbol of a slot with minimum time separation of X symbols between the first symbol of two consecutive spans, including across slots. The duration of a span is $d_{span}$=max ($d_{CORESET,max}$, $Y_{min}$), where $d_{CORESET,max}$ is a maximum duration among durations of CORESETs that are configured to the UE and $Y_{min}$ is a minimum value of Y in the combinations of (X,Y) that are reported by the UE. A last span in a slot can have a shorter duration than other spans in the slot. A UE capability for PDCCH monitoring per slot or per span on an active downlink (DL) bandwidth part (BWP) of a serving cell is defined by a maximum number of PDCCH candidates and non-overlapped CCEs the UE can monitor per slot or per span, respectively, on the active DL BWP of the serving cell.

Scenario 100 illustrates an example of span determination. The UE may report the spans it can support. For example, the UE may report the supported span (X,Y)={(7, 3), (4,3)} to the network node. The network node may select at least one of them and configure the selected span to the UE. A particular PDCCH monitoring configuration that meets the UE capability limitation may be configured if the span arrangement satisfies the gap separation for at least one (X,Y) in the UE reported candidate value set in every slot, including cross slot boundary. For example, the network node may determine that span duration=max{maximum value of all CORESET durations, min of Y}=max{3,3}=3. The span arrangement does not satisfy the gap separation for (X,Y)=(7,3) and can satisfy the gap separation for (X,Y)= (4,3). Therefore, the PDCCH monitoring configuration corresponding to monitoring span (X,Y)=(4,3) can be configured to the UE by the network node.

Figure 2:
FIG. 2 is a diagram depicting an example table of CCEs and BDs budgets under schemes in accordance with implementations of the present disclosure.

In Rel-15, the maximum number of non-overlapped CCEs and the maximum number of monitored PDCCH candidates (e.g., the maximum number of BDs) are specified per slot for different sub-carrier spacing (SCS) (e.g., µ=0, 1, 2 or 3). In Rel-16, the maximum number of non-overlapped CCEs and the maximum number of monitored PDCCH candidates (e.g., the maximum number of BDs) are specified per span for combinations of (X,Y) and different SCS (e.g., µ=0 or 1). FIG. 2 illustrates an example table 200 under schemes in accordance with implementations of the present disclosure. Table 200 illustrates the CCEs budgets and BDs budgets corresponding to the Rel-15 slot-based configuration and the Rel-16 span-based configuration respectively. 3 monitoring spans are introduced in Rel-16 including (2, 2), (4, 3) and (7, 3). The UE may be configured to determine the CCEs budgets and BDs budgets according to table 200 which is also defined in the 3GPP technical specification for NR.

Figure 3:
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a plurality of network nodes, which may be a part of a wireless communication network (e.g., an LTE network, a 5G network, an NR network, an IoT network, an NB-IoT network or an IIoT network). Scenario 300 illustrates an example of CCEs/BDs budgets determination. The CCEs/BDs budgets are defined per span in Rel-16 for SCS=15 kHz (e.g., µ=0) and 30 kHz (e.g., µ=1). Assuming that the PDCCH monitoring configuration corresponding to monitoring span (X,Y)=(4,3) is configured and the SCS is 15 kHz, the UE may be configured to determine the CCEs/BDs budgets according to table 200 defined in 3GPP technical specification for NR. As shown in FIG. 3, for (X,Y)=(4,3) and SCS=15 kHz, the UE may determine that the CCE budgets is equal to 36 and the BDs budgets is equal to 28 for each span.

However, the PDCCH monitoring capability in CA scenarios is yet to be clearly defined. One issue is that the CCs configured with the same span (X,Y) can have staggered spans (i.e., the CCs sharing the same spans (X,Y) are not configured with fully aligned spans). If the spans are not aligned, then the Rel-15 formula for CCEs/BDs budget could not be used and different approach has been defined. The new defined approach comes with extra complexity for UE implementation. Not every UE can support such extra complexity on UE implementation. When the UE can only support the approach for aligned spans, some errors could occur in an event that non-aligned spans are configured to such UE. To avoid failure and un-synchronization on PDCCH monitoring, the network node needs to configure PDCCH monitoring configuration based on UE capabilities. Therefore, it is needed for the UE to report the capability of supporting aligned and/or non-aligned spans.

In view of the above, the present disclosure proposes a number of schemes pertaining to PDCCH monitoring enhancement for CA with respect to the UE and the network apparatus. According to the schemes of the present disclosure, since the span-based PDCCH monitoring capability is introduced and both aligned spans and non-aligned spans may be configured, the UE may be configured to report its capability to inform the network node which PDCCH monitoring capability it can support. Some UEs may support only aligned spans across CCs with the same numerology or different numerologies. Some UEs may support both aligned spans and non-aligned spans across CCs with the same numerology or different numerologies. These two options may be defined as one or two UE capabilities. The UE may report which capability it can support. With the capability information from the UE, the network node may be able to configure proper PDCCH monitoring configuration to the UE. The UE may also expect to receive a specific PDCCH monitoring configuration compliant with its capability. Accordingly, PDCCH monitoring capability needs to be properly specified/determined for CA scenarios for Rel-16 span-based PDCCH monitoring. The network node and the UE can configure and monitor PDCCH correctly/properly based on the newly introduced capability report.

Figure 4:
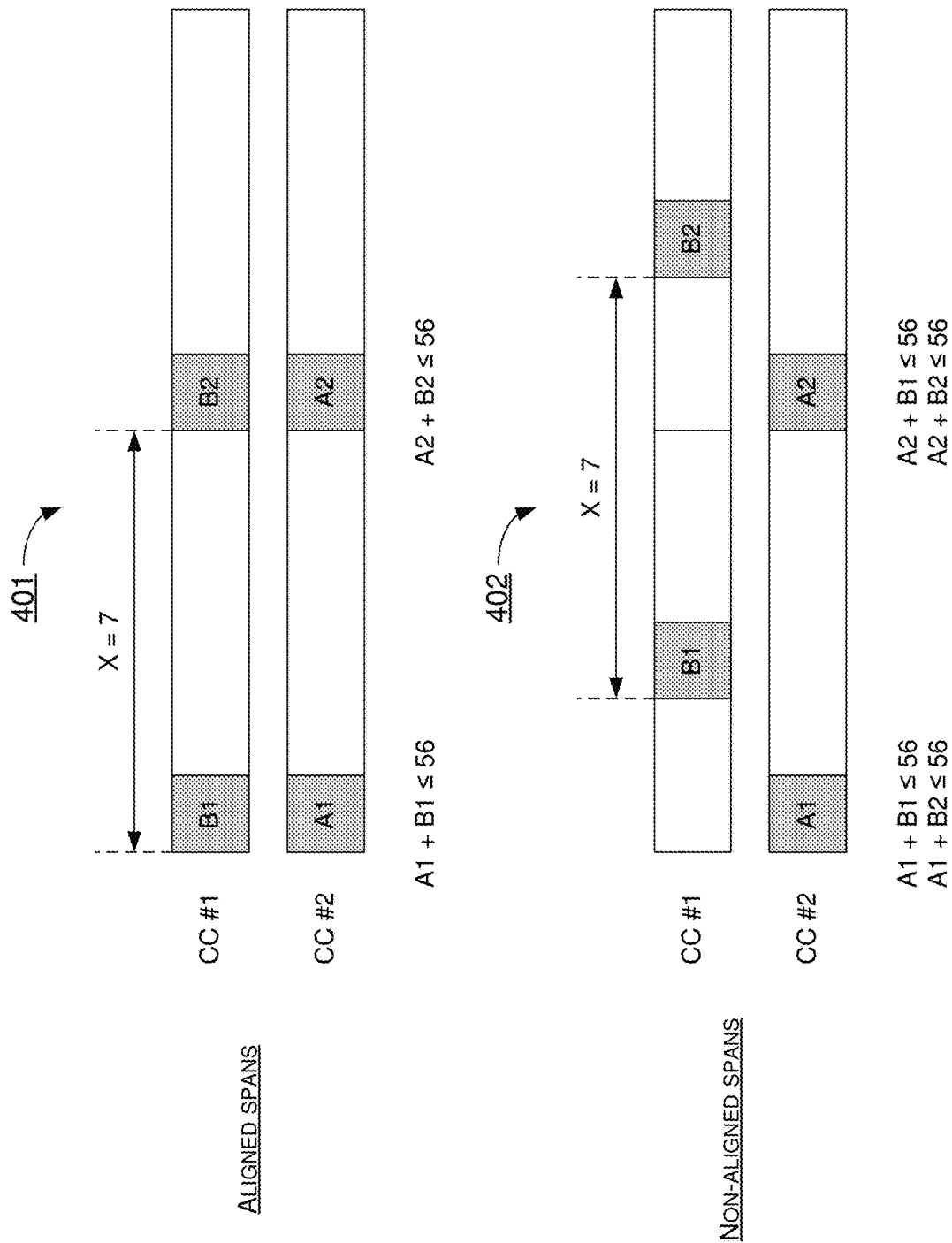
FIG. 4 is a diagram depicting example scenarios under schemes in accordance with implementations of the present disclosure.

FIG. 4 illustrates example scenarios 401 and 402 under schemes in accordance with implementations of the present disclosure. Scenarios 401 and 402 involve a UE and a plurality of network nodes, which may be a part of a wireless communication network (e.g., an LTE network, a 5G network, an NR network, an IoT network, an NB-IoT network or an IIoT network). The UE may support 2 CCs and report pdcchMonitoringCA-r16=1 with (7, 3, 56) (e.g., maximum number of non-overlapped CCEs=56 for combination (X,Y) =(7,3)). The UE may be configured with Rel-16 PDCCH monitoring configuration with same span arrangement on both CCs. Scenario 401 illustrates an examples of aligned spans. For the aligned case, for every span in every carrier, it exists a span in every other carrier starting from the same symbol. If not, then it is a non-aligned case. In scenario 401, the PDCCH monitoring configurations on CC #1 and CC #2 are aligned. For example, the starting point of A1 and B1 are on the same symbol position. In scenario 402, the PDCCH monitoring configurations on CC #1 and CC #2 are non-aligned. For example, the starting point of A1 and B1 are on different symbol positions.

In some implementations, in case all the spans look aligned but there are some empty spans, then for simplicity, this should be considered as non-aligned. Dealing with all the corner cases, will add extra complexity and doesn't encourage the implementation of this feature. Also, the combination of cells where some of them have aligned spans and the remaining cells have non-aligned spans, should be considered as non-aligned.

Specifically, in a case that the Rel-16 PDCCH per-san monitoring capability is supported per scheduling CC, the UE may be configured to transmit a capability report to indicate a supported PDCCH monitoring capability to the network node. The supported PDCCH monitoring capability comprises a supported span arrangement. For example, the supported span arrangement may comprise only aligned spans across CCs. In other words, the UE only supports PDCCH monitoring on aligned spans across CCs. In another example, the supported span arrangement may comprise both aligned spans and non-aligned spans across CCs. In other words, the UE can support PDCCH monitoring on both aligned spans and non-aligned spans across CCs.

After receiving the capability report from the UE, the network node may select a span arrangement supported by the UE and configure the PDCCH monitoring configuration based on the supported span arrangement to the UE. The UE may be configured to receive the monitoring configuration compliant with the supported PDCCH monitoring capability from the network node. Then, the UE may determine a monitoring budget based on the monitoring configuration and the supported PDCCH monitoring capability. The UE may perform the PDCCH monitoring according to the monitoring budget.

In Rel-16, the approaches (e.g., formulas) for determining monitoring budgets (e.g., maximum number of non-overlapping CCEs or BDs) for aligned spans and non-aligned spans are different. The UE may be configured to determine which span arrangement is configured by the network node and apply/use a corresponding approach to determine the monitoring budget. For example, the UE may determine the monitoring budget according to a first approach in an event that the aligned spans are configured. The UE may determine the monitoring budget according to a second approach in an event that the non-aligned spans are configured. The second approach may be different from the first approach.

In some implementations, if a UE is configured only with $N_{cells,r16}^{DL,\mu}$ downlink cells for which the UE is provided monitoringCapabilityConfig-r16=r16monitoringcapability and with associated PDCCH candidates monitored in the active downlink (DL) bandwidth parts (BWPs) of the scheduling cells using SCS configuration µ, and with $N_{cells,r16}^{DL,(X,Y),\mu}$ of the $N_{cells,r16}^{DL,\mu}$ downlink cells using combination (X,Y) for PDCCH monitoring, where $\Sigma_{\mu=0}^{\mu} N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,(X,Y),\mu} = \lfloor N_{cells}^{cap-r16} \cdot M_{PDCCH}^{max,(X,Y),\mu} \cdot N_{cells,r16}^{DL,(X,Y),\mu} / \Sigma_{j=0}^{1} N_{cells,r16}^{DL,j} \rfloor$ PDCCH candidates or more than $C_{PDCCH}^{total,(X,Y),\mu} = \lfloor N_{cells}^{cap-r16} \cdot C_{PDCCH}^{max,(X,Y),\mu} \cdot N_{cells,r16}^{DL,(X,Y),\mu} / \Sigma_{j=0}^{1} N_{cells,r16}^{DL,j} \rfloor$ non-overlapped CCEs per set of spans on the active DL BWP(s) of all scheduling cell(s) from the $N_{cells,r16}^{DL,(X,Y),\mu}$ downlink cells within every X symbols, if the union of PDCCH monitoring occasions on all scheduling cells from the $N_{cells,r16}^{DL,(X,Y),\mu}$ downlink cells results to PDCCH monitoring according to the combination (X,Y) and any pair of spans in the set is within Y symbols, where first X symbols start at a first symbol with a PDCCH monitoring occasion and next X symbols start at a first symbol with a PDCCH monitoring occasion that is not included in the first X symbols (i.e., aligned spans), or per set of spans across the active DL BWP(s) of all scheduling cells from the $N_{cells,r16}^{DL,(X,Y),\mu}$ downlink cells, with at most one span per scheduling cell for each set of spans (i.e., non-aligned spans), otherwise.

$N_{cells,r16}^{DL,j}$ is a number of configured cells with associated PDCCH candidates monitored in the active DL BWPs of the scheduling cells using SCS configuration j. If a UE is configured with downlink cells for which the UE is provided both monitoringCapabilityConfig-r16=r15monitoringcapability and monitoringCapabilityConfig-r16=r16monitoringcapability, $N_{cells}^{cap-r16}$ is replaced by $N_{cells,r16}^{cap-r16}$.

In some implementations, after determining the monitoring budget, the UE may be configured to split the monitoring budget among a plurality of CCs with aligned spans. The CCs with aligned spans may be grouped and the monitoring budget corresponding to the CCs with aligned spans may be determined/calculated together and shared among the CCs. The UE may determine the monitoring budget for all aligned spans.

In some implementations, the UE may be configured to determine whether a PDCCH monitoring configuration is compliant with the supported PDCCH monitoring capability. The UE may consider the PDCCH monitoring configuration as an error case in an event that the PDCCH monitoring configuration is different from the supported PDCCH monitoring capability. The UE may ignore the PDCCH monitoring configuration in an event that the PDCCH monitoring configuration is different from the supported PDCCH monitoring capability. For example, the UE may transmit a capability report to indicate that it supports only aligned spans. In an event that the network node configures non-aligned spans among CCs to the UE, the UE may consider such PDCCH monitoring configuration is an error case and ignore the configuration.

In some implementations, the capability report transmitted by the UE may comprise an indication indicating whether only aligned spans is supported across carrier components (e.g., a first bit to indicate whether aligned spans is supported across carrier components). The capability report transmitted by the UE may further comprise an indication indicating whether both aligned and non-aligned spans are supported across carrier components (e.g., a second bit to indicate whether both aligned spans and non-aligned spans are supported across carrier components). For example, a parameter or an information field (e.g., supportedSpanArrangement-r16) may be used/defined in UE's capability report. The parameter/information field may comprise a first indication (e.g., 0 or 1) to indicate whether the aligned spans is supported and a second indication (e.g., 0 or 1) to indicate whether both of the aligned spans and non-aligned spans are supported (e.g., ENUMERATED {alignedOnly, alignedAndNonAligned}).

Figure 5:
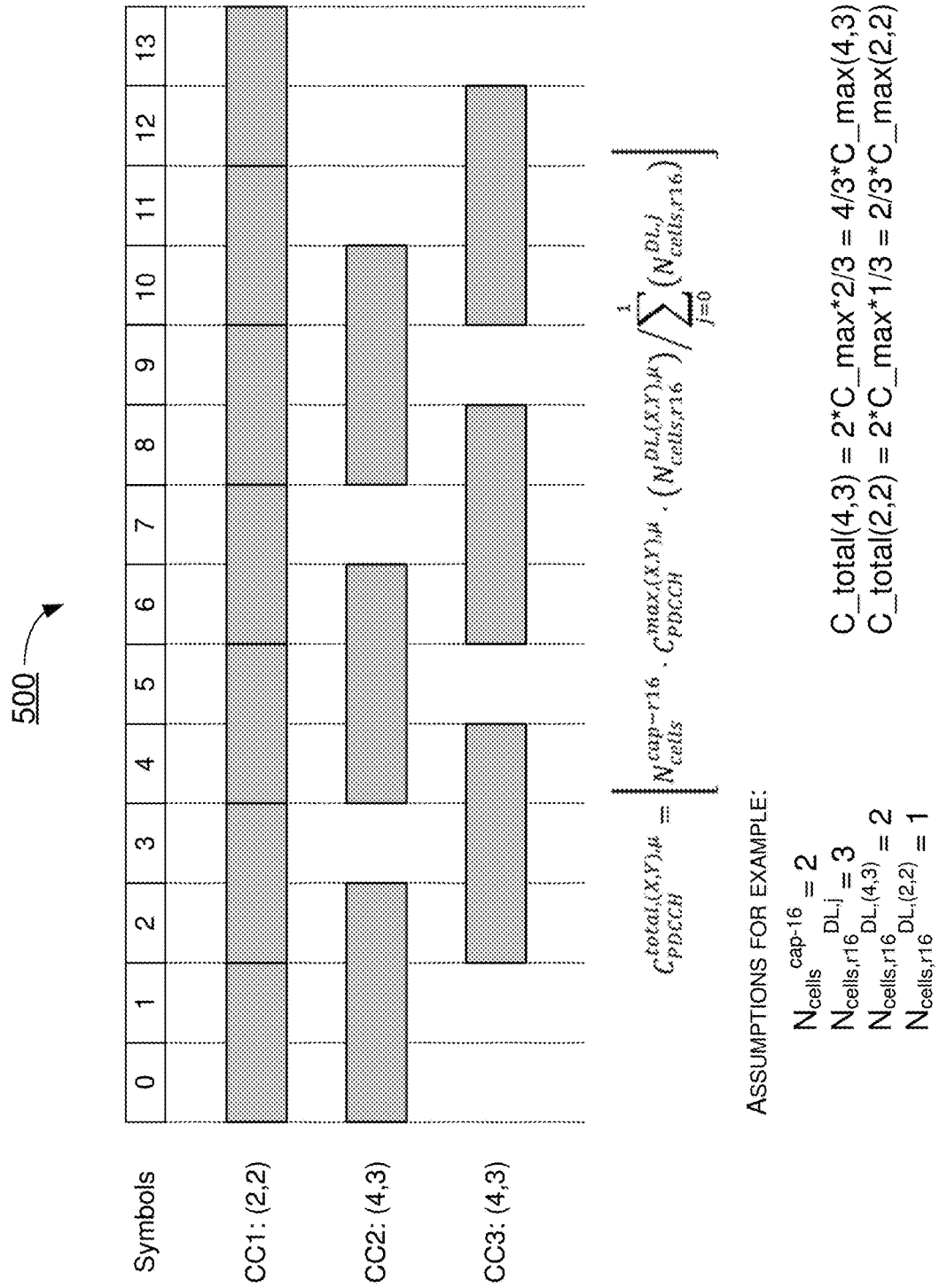
FIG. 5 is a diagram depicting an example scenario under schemes in accordance with implementations of the present disclosure.

In some implementations, the maximum number of non-overlapping CCEs per span a UE monitors for serving $N_{cells}^{(DL,(X,Y),\mu)}$ cells is given by $C_{PDCCH}^{toal,(X,Y),\mu}$. One possible calculation of $C_{PDCCH}^{toal,(X,Y),\mu}$ is given by $C_{PDCCH}^{total,(X,Y),\mu} = \lfloor N_{cells}^{cap-r16} \cdot C_{PDCCH}^{max,(X,Y),\mu} \cdot (N_{cells,r16}^{DL(X,Y),\mu})/\Sigma_{j=0}^{1}(N_{cells,r16}^{DL,j}) \rfloor$. FIG. 5 illustrates an example scenario 500 under schemes in accordance with implementations of the present disclosure. The UE may be configured with combination (X,Y)=(2, 2) on CC1 and combination (X,Y)=(4,3) on CC2 and CC3 for PDCCH monitoring. FIG. 5 illustrates one possible approach to calculate the maximum number of non-overlapping CCEs. For example, assuming C_max=16 for (2,2) and C_max=32 for (4,3), then C_total(4,3)=2*32*2/3=42 and C_total(2,2)= 21*6*1/3=10. Hence, for CC1, CCE_max=10, and for CC2 and CC3, CCE_max=21 (assuming equal split). This is not optimal and 10 CCEs for CC1 doesn't allow for aggregation level 16 to be scheduled. However in this calculation, in the denominator, the summation is across all the cells regardless of spans (X,Y) which is suboptimal and leads to an issue in splitting the CCES and the BDs budgets.

In accordance with implementations of the present disclosure, one possible solution is to split the configured cells into groups, where in each group the cells share the same span pattern (X,Y). This could be reflected in the previous equation in its denominator where the summation will be across cells with the same span pattern (X,Y) instead of all the cells. The CCEs/BDs budget will be derived separately for each group of cells sharing the same spans.

In some implementations, another alternative method to split the CCEs/BDs budgets across the configured CCs is to use the following formula, where the network node ensures this formula is verified for the allocated CCEs/BDs budgets to different cells to be compliant. In a first step, from the number of CCEs/BDs configured to the UE, the UE/network node may derive an equivalent (virtual) number of cells by $$N_{cells} = \sum_{i=0}^{1} \sum_{(X,Y)} \left\lceil \frac{\sum_{j} C_{cell,j}^{(X,Y),i}}{C_{PDCCH}^{Max,(X,Y),i}} \right\rceil \cdot C_{cell,j}^{(X,Y),i}$$

$C_{cell,j}^{(X,Y),i}$ is the allocated/configured number of CCEs or BDs to the cell j with numerology i using the span pattern (X,Y) for specific configured span. $C_{PDCCH}^{Max,(X,Y),i}$ is the maximum limit on the number of CCEs or BDs allocated to a cell with numerology i using the span pattern (X,Y). $N_{cells}$ is an equivalent virtual number of cells that the UE/network node will derive. It calculates the number of equivalent cells that the UE is configured with based on/assuming its monitoring capability. In another implementation, the number of equivalent (virtual) cells could be derived per combination of spans from all the cells, one span, any span per cell. Hence, multiple number $N_{cells}$ are calculated, one per combination and the maximum is to be compared against the capability. The second step is to compare the derived number against the monitoring capability, where $N_{cells} \leq N_{cells}^{cap-r16}$. The UE may be configured to verify that the number of equivalent cells is compliant with its monitoring capability. If verified, then the UE is correctly configured within its capability.

In some implementations, in a first step, the UE/network node may derive an equivalent (virtual) number of cells by $$N_{cells} = \sum_{i=0}^{1} \sum_{(X,Y)} \left\lceil \frac{C^{(X,Y),i}}{C_{PDCCH}^{Max,(X,Y),i}} \right\rceil,$$

where $C^{(X,Y),i} = \max_k (\Sigma_j C_{cell,j}^{(X,Y),i,k})$. $C^{(X,Y),i}$ is the maximum total number of CCEs/BDs across all the possible combination of spans formed by taking one span, any span, from each of the serving cells. This maximum is per numerology i using the span pattern (X,Y). In another implementation, this maximum could be across the overlapping spans across CCs. $C_{cell,j}^{(X,Y),i,k}$ is the allocated/configured number of CCEs or BDs to the cell j with numerology i using the span pattern (X,Y) for a certain specific configured span k. $C_{PDCCH}^{Max,(X,Y),i}$ is the maximum limit on the number of CCEs or BDs allocated to a cell with numerology i using the span pattern (X,Y). $N_{cells}$ is an equivalent virtual number of cells that the UE/network node will derive. It calculates the number of equivalent cells that the UE is configured with based on/assuming its monitoring capability. The second step is to compare the derived number against the monitoring capability, where $N_{cells} \leq N_{cells}^{cap-r16}$. The UE may be configured to verify that the number of equivalent cells is compliant with its monitoring capability. If verified, then the UE is correctly configured within its capability.

For example, based on the assumption in FIG. 5, C1_max=16 and C2_max=32. In this case, the following combinations for example are valid: CCEs for CC1=[2 14 4 4 5 7 8], CCEs for CC2=[1 15 1] and CCEs for CC3=[17 17 5]. The following combinations for example are not valid: CCEs for CC1=[7 10 16 2 16 14 14], CCEs for CC2=[31 4 18] and CCEs for CC3=[13 25 6].

Illustrative Implementations

Figure 6:
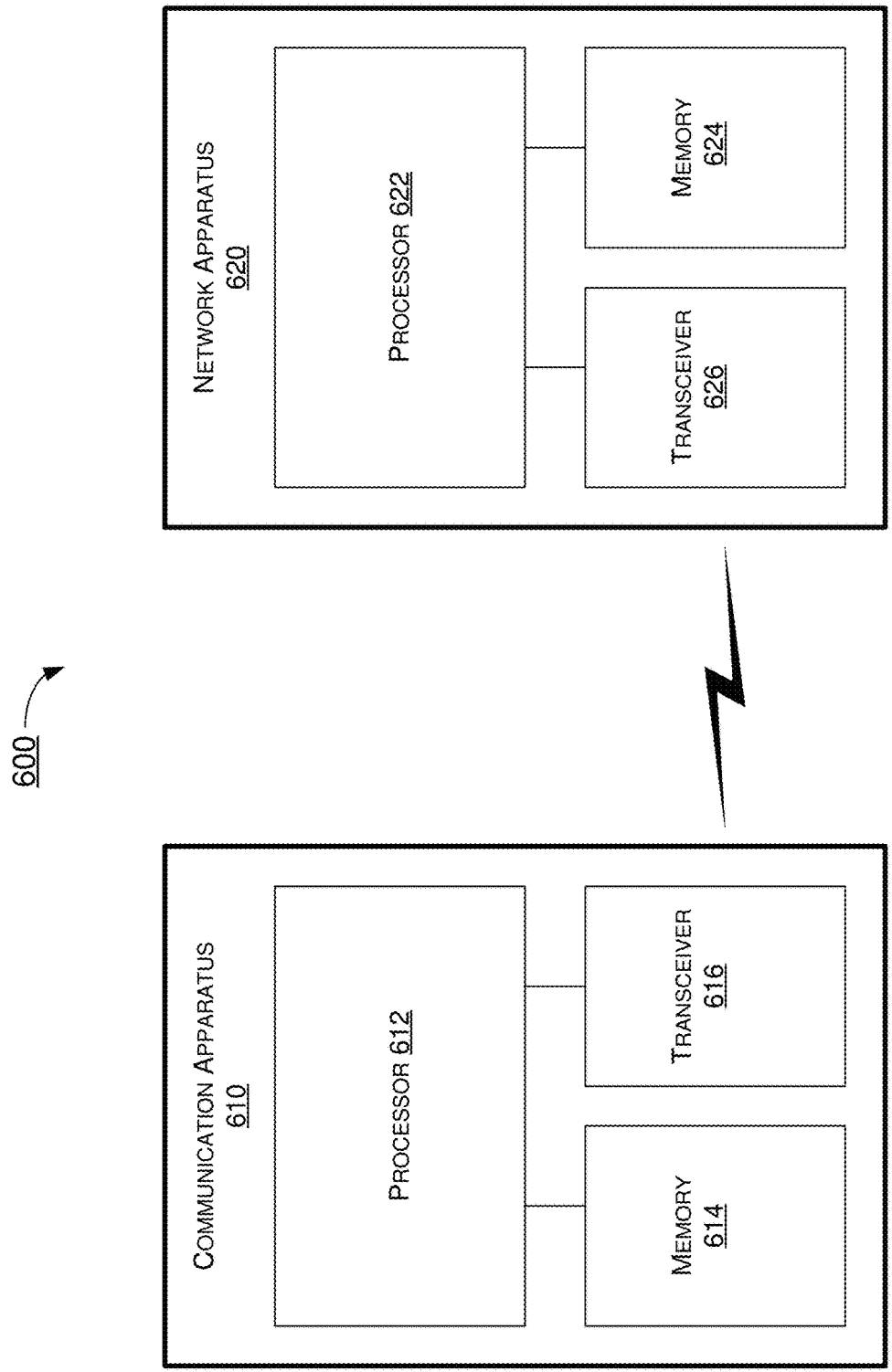
FIG. 6 is a block diagram of an example communication apparatus and an example network apparatus in accordance with an implementation of the present disclosure.

FIG. 6 illustrates an example communication apparatus 610 and an example network apparatus 620 in accordance with an implementation of the present disclosure. Each of communication apparatus 610 and network apparatus 620 may perform various functions to implement schemes, techniques, processes and methods described herein pertaining to PDCCH monitoring enhancement for CA with respect to user equipment and network apparatus in wireless communications, including scenarios/schemes described above as well as process 700 described below.

Communication apparatus 610 may be a part of an electronic apparatus, which may be a UE such as a portable or mobile apparatus, a wearable apparatus, a wireless communication apparatus or a computing apparatus. For instance, communication apparatus 610 may be implemented in a smartphone, a smartwatch, a personal digital assistant, a digital camera, or a computing equipment such as a tablet computer, a laptop computer or a notebook computer. Communication apparatus 610 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 610 may be implemented in a smart thermostat, a smart fridge, a smart door lock, a wireless speaker or a home control center. Alternatively, communication apparatus 610 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 610 may include at least some of those components shown in FIG. 6 such as a processor 612, for example. Communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of an electronic apparatus, which may be a network node such as a base station, a small cell, a router or a gateway. For instance, network apparatus 620 may be implemented in an eNodeB in an LTE, LTE-Advanced or LTE-Advanced Pro network or in a gNB in a 5G, NR, IoT, NB-IoT or IIoT network. Alternatively, network apparatus 620 may be implemented in the form of one or more IC chips such as, for example and without limitation, one or more single-core processors, one or more multi-core processors, or one or more RISC or CISC processors. Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including power consumption reduction in a device (e.g., as represented by communication apparatus 610) and a network (e.g., as represented by network apparatus 620) in accordance with various implementations of the present disclosure.

In some implementations, communication apparatus 610 may also include a transceiver 616 coupled to processor 612 and capable of wirelessly transmitting and receiving data. In some implementations, communication apparatus 610 may further include a memory 614 coupled to processor 612 and capable of being accessed by processor 612 and storing data therein. In some implementations, network apparatus 620 may also include a transceiver 626 coupled to processor 622 and capable of wirelessly transmitting and receiving data. In some implementations, network apparatus 620 may further include a memory 624 coupled to processor 622 and capable of being accessed by processor 622 and storing data therein. Accordingly, communication apparatus 610 and network apparatus 620 may wirelessly communicate with each other via transceiver 616 and transceiver 626, respectively. To aid better understanding, the following description of the operations, functionalities and capabilities of each of communication apparatus 610 and network apparatus 620 is provided in the context of a mobile communication environment in which communication apparatus 610 is implemented in or as a communication apparatus or a UE and network apparatus 620 is implemented in or as a network node of a communication network.

In some implementations, processor 612 may be configured to transmit, via transceiver 616, a capability report to indicate a supported PDCCH monitoring capability to network apparatus 620. The supported PDCCH monitoring capability comprises a supported span arrangement. For example, the supported span arrangement may comprise only aligned spans across CCs. In other words, processor 612 only supports PDCCH monitoring on aligned spans across CCs. In another example, the supported span arrangement may comprise both aligned spans and non-aligned spans across CCs. In other words, processor 612 can support PDCCH monitoring on both aligned spans and non-aligned spans across CCs.

In some implementations, after receiving the capability report from communication apparatus 610, network apparatus 620 may select a span arrangement supported by communication apparatus 610 and configure the PDCCH monitoring configuration based on the supported span arrangement to communication apparatus 610. Processor 612 may be configured to receive, via transceiver 616, the PDCCH monitoring configuration compliant with the supported PDCCH monitoring capability from network apparatus 620. Then, processor 612 may determine a monitoring budget based on the PDCCH monitoring configuration and the supported PDCCH monitoring capability. Processor 612 may perform, via transceiver 616, the PDCCH monitoring according to the monitoring budget.

In some implementations, the approaches (e.g., formulas) for determining monitoring budgets (e.g., maximum number of non-overlapping CCEs or BDs) for aligned spans and non-aligned spans are different. Processor 612 may be configured to determine which span arrangement is configured by network apparatus 620 and apply/use a corresponding approach to determine the monitoring budget. For example, processor 612 may determine the monitoring budget according to a first approach in an event that the aligned spans are configured. Processor 612 may determine the monitoring budget according to a second approach in an event that the non-aligned spans are configured. The second approach may be different from the first approach.

In some implementations, after determining the monitoring budget, processor 612 may be configured to split the monitoring budget among a plurality of CCs with aligned spans. Processor 612 may group the CCs with aligned spans and determine/calculate the monitoring budget corresponding to the CCs with aligned spans together. Processor 612 may share the monitoring budget among the CCs. Processor 612 may determine the monitoring budget for all aligned spans.

In some implementations, processor 612 may be configured to determine whether a PDCCH monitoring configuration is compliant with the supported PDCCH monitoring capability. Processor 612 may consider the PDCCH monitoring configuration as an error case in an event that the PDCCH monitoring configuration is different from the supported PDCCH monitoring capability. Processor 612 may ignore the PDCCH monitoring configuration in an event that the PDCCH monitoring configuration is different from the supported PDCCH monitoring capability. For example, processor 612 may transmit, via transceiver 616, a capability report to indicate that it supports only aligned spans. In an event that network apparatus 620 configures non-aligned spans among CCs to communication apparatus 610, processor 612 may consider such PDCCH monitoring configuration is an error case and ignore the configuration.

In some implementations, the capability report transmitted processor 612 may comprise an indication indicating whether only aligned spans is supported across carrier components (e.g., a first bit to indicate whether aligned spans is supported across carrier components). The capability report transmitted by processor 612 may further comprise an indication indicating whether both aligned and non-aligned spans are supported across carrier components (e.g., a second bit to indicate whether both aligned spans and non-aligned spans are supported across carrier components). For example, a parameter or an information field (e.g., supportedSpanArrangement-r16) may be used/defined in the capability report. Processor 612 may use a first indication (e.g., 0 or 1) to indicate whether the aligned spans is supported and use a second indication (e.g., 0 or 1) to indicate whether both of the aligned spans and non-aligned spans are supported (e.g., ENUMERATED {alignedOnly, alignedAndNonAligned}).

In some implementations, processor 612 may be configured to split the configured cells into groups, where in each group the cells share the same span pattern (X,Y). This could be reflected in the previous equation in its denominator where the summation will be across cells with the same span pattern (X,Y) instead of all the cells. Processor 612 may derive the CCEs/BDs budget separately for each group of cells sharing the same spans.

Illustrative Processes

Figure 7:
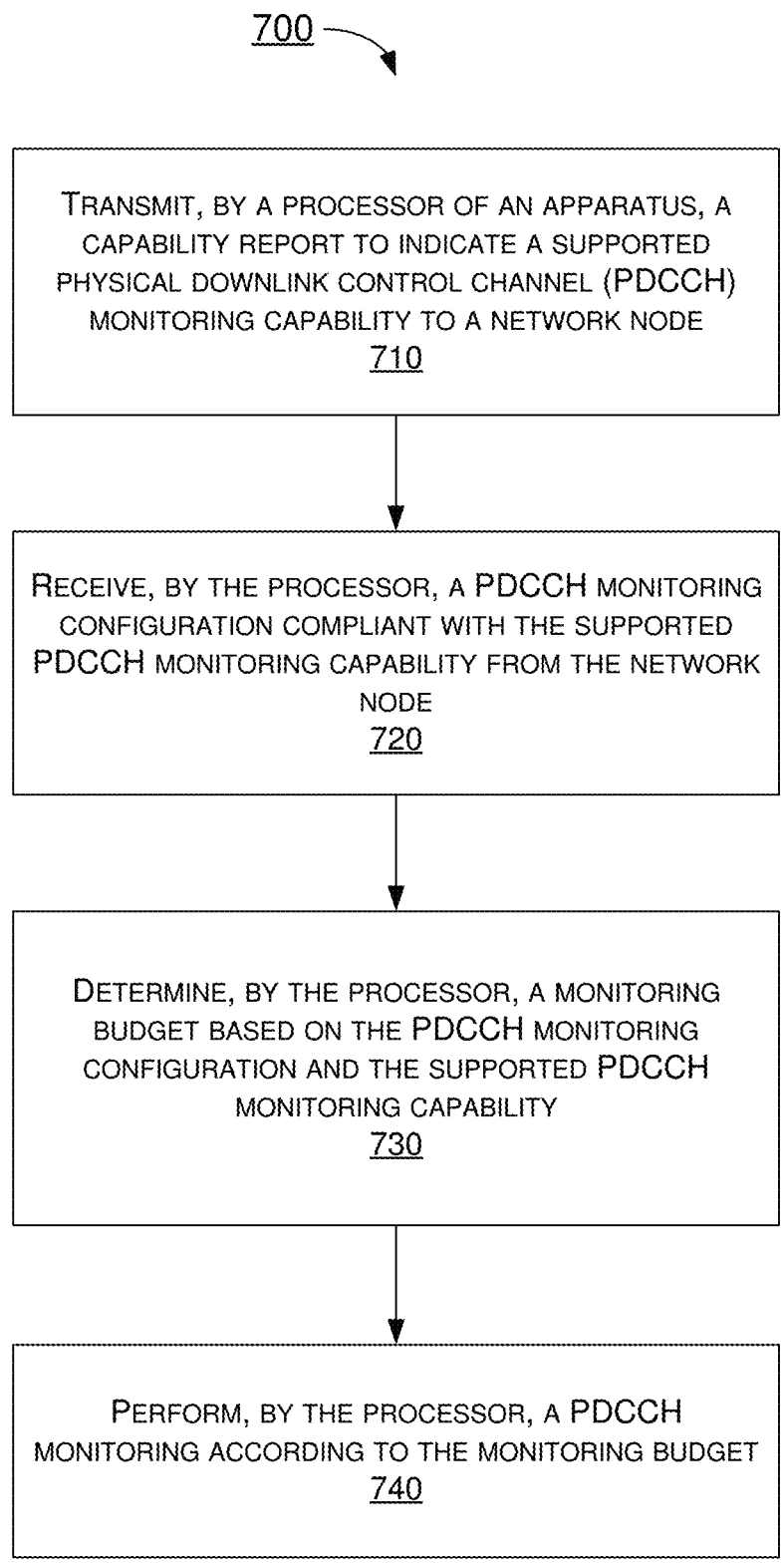
FIG. 7 is a flowchart of an example process in accordance with an implementation of the present disclosure.

FIG. 7 illustrates an example process 700 in accordance with an implementation of the present disclosure. Process 700 may be an example implementation of schemes described above, whether partially or completely, with respect to PDCCH monitoring enhancement for CA with the present disclosure. Process 700 may represent an aspect of implementation of features of communication apparatus 610. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks of process 700 may be executed in the order shown in FIG. 7 or, alternatively, in a different order. Process 700 may be implemented by communication apparatus 610 or any suitable UE or machine type devices. Solely for illustrative purposes and without limitation, process 700 is described below in the context of communication apparatus 610. Process 700 may begin at block 710.

At 710, process 700 may involve processor 612 of apparatus 610 transmitting a capability report to indicate a PDCCH monitoring capability to a network node. Process 700 may proceed from 710 to 720.

At 720, process 700 may involve processor 612 receiving a PDCCH monitoring configuration compliant with the supported PDCCH monitoring capability from the network node. Process 700 may proceed from 720 to 730.

At 730, process 700 may involve processor 612 determining a monitoring budget based on the PDCCH monitoring configuration and the supported PDCCH monitoring capability. Process 700 may proceed from 730 to 740.

At 740, process 700 may involve processor 612 performing a PDCCH monitoring according to the monitoring budget. The supported PDCCH monitoring capability may comprise a supported span arrangement.

In some implementations, the supported span arrangement may comprise only aligned spans across component carriers.

In some implementations, the supported span arrangement may comprise both aligned spans and non-aligned spans across component carriers.

In some implementations, process 700 may involve processor 612 determining the monitoring budget according to a first approach in an event that the aligned spans are configured.

In some implementations, process 700 may involve processor 612 determining the monitoring budget according to a second approach in an event that the non-aligned spans are configured.

In some implementations, process 700 may involve processor 612 splitting the monitoring budget among a plurality of component carriers with aligned spans.

In some implementations, process 700 may involve processor 612 determining whether a PDCCH monitoring configuration is compliant with the supported PDCCH monitoring capability. Process 700 may further involve processor 612 considering the PDCCH monitoring configuration as an error case in an event that the PDCCH monitoring configuration is different from the supported PDCCH monitoring capability.

In some implementations, process 700 may involve processor 612 determining whether a PDCCH monitoring configuration is compliant with the supported PDCCH monitoring capability. Process 700 may further involve processor 612 ignoring the PDCCH monitoring configuration in an event that the PDCCH monitoring configuration is different from the supported PDCCH monitoring capability.

In some implementations, the capability report may comprise an indication indicating whether only aligned spans is supported across carrier components.

In some implementations, the capability report may comprise an indication indicating whether both aligned and non-aligned spans are supported across carrier components.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by a processor of an apparatus, a capability report to indicate a supported physical downlink control channel (PDCCH) monitoring capability to a network node of a wireless network;
   receiving, by the processor, a PDCCH monitoring configuration compliant with the supported PDCCH monitoring capability from the network node;
   determining, by the processor, a monitoring budget based on the PDCCH monitoring configuration and the supported PDCCH monitoring capability;
   performing, by the processor, a PDCCH monitoring according to the monitoring budget; and
   splitting, by the processor, a plurality of configured cells of the wireless network into multiple groups such that a subset of the plurality of configured cells in each group of the multiple groups share a same span pattern,
   wherein the supported PDCCH monitoring capability comprises a supported span arrangement.

2. The method of claim 1, wherein the supported span arrangement comprises only aligned spans across component carriers.

3. The method of claim 2, wherein the determining comprises determining the monitoring budget according to a first approach in an event that the aligned spans are configured.

4. The method of claim 1, wherein the supported span arrangement comprises both aligned spans and non-aligned spans across component carriers.

5. The method of claim 4, wherein the determining comprises determining the monitoring budget according to a second approach in an event that the non-aligned spans are configured.

6. The method of claim 1, further comprising:
   splitting, by the processor, the monitoring budget among a plurality of component carriers with aligned spans.

7. The method of claim 1, further comprising:
   determining, by the processor, whether a PDCCH monitoring configuration is compliant with the supported PDCCH monitoring capability; and
   considering, by the processor, the PDCCH monitoring configuration as an error case in an event that the PDCCH monitoring configuration is different from the supported PDCCH monitoring capability.

8. The method of claim 1, further comprising:
   determining, by the processor, whether a PDCCH monitoring configuration is compliant with the supported PDCCH monitoring capability; and
   ignoring, by the processor, the PDCCH monitoring configuration in an event that the PDCCH monitoring configuration is different from the supported PDCCH monitoring capability.

9. The method of claim 1, wherein the capability report comprises an indication indicating whether only aligned spans is supported across carrier components.

10. The method of claim 1, wherein the capability report comprises an indication indicating whether both aligned and non-aligned spans are supported across carrier components.

11. An apparatus, comprising:
    a transceiver which, during operation, wirelessly communicates with a network node of a wireless network; and
    a processor communicatively coupled to the transceiver such that, during operation, the processor performs operations comprising:
    transmitting, via the transceiver, a capability report to indicate a supported physical downlink control channel (PDCCH) monitoring capability to a network node;
    receiving, via the transceiver, a PDCCH monitoring configuration compliant with the supported PDCCH monitoring capability from the network node;
    determining a monitoring budget based on the PDCCH monitoring configuration and the supported PDCCH monitoring capability;
    performing a PDCCH monitoring according to the monitoring budget; and
    splitting a plurality of configured cells of the wireless network into multiple groups such that a subset of the plurality of configured cells in each group of the multiple groups share a same span pattern,
    wherein the supported PDCCH monitoring capability comprises a supported span arrangement.

12. The apparatus of claim 11, wherein the supported span arrangement comprises only aligned spans across component carriers.

13. The apparatus of claim 12, wherein, in determining the monitoring budget, the processor determines the monitoring budget according to a first approach in an event that the aligned spans are configured.

14. The apparatus of claim 11, wherein the supported span arrangement comprises both aligned spans and non-aligned spans across component carriers.

15. The apparatus of claim 14, wherein, in determining the monitoring budget, the processor determines the monitoring budget according to a second approach in an event that the non-aligned spans are configured.

16. The apparatus of claim 11, wherein, during operation, the processor further performs operations comprising:
    splitting the monitoring budget among a plurality of component carriers with aligned spans.

17. The apparatus of claim 11, wherein, during operation, the processor further performs operations comprising:
    determining whether a PDCCH monitoring configuration is compliant with the supported PDCCH monitoring capability; and
    considering the PDCCH monitoring configuration as an error case in an event that the PDCCH monitoring configuration is different from the supported PDCCH monitoring capability.

18. The apparatus of claim 11, wherein, during operation, the processor further performs operations comprising:
    determining whether a PDCCH monitoring configuration is compliant with the supported PDCCH monitoring capability; and
    ignoring the PDCCH monitoring configuration in an event that the PDCCH monitoring configuration is different from the supported PDCCH monitoring capability.

19. The apparatus of claim 11, wherein the capability report comprises an indication indicating whether only aligned spans is supported across carrier components.

20. The apparatus of claim 11, wherein the capability report comprises an indication indicating whether both aligned and non-aligned spans are supported across carrier components.

* * * * *